(12) United States Patent
Stoehr et al.

(10) Patent No.: US 8,272,469 B2
(45) Date of Patent: Sep. 25, 2012

(54) BEARING ASSEMBLY

(75) Inventors: Kyle C. Stoehr, Waukesha, WI (US); Scott T. Breyer, Dousman, WI (US)

(73) Assignee: Oconomowoc Mfg. Corp., Oconomowoc, WI (US)

( * ) Notice: Subject to any disclaimer, the term of this patent is extended or adjusted under 35 U.S.C. 154(b) by 256 days.

(21) Appl. No.: 12/758,401

(22) Filed: Apr. 12, 2010

(65) Prior Publication Data
US 2011/0247890 A1  Oct. 13, 2011

(51) Int. Cl.
*B60T 1/06* (2006.01)
(52) U.S. Cl. ........ 180/337; 180/312; 464/110; 384/537; 188/18 A
(58) Field of Classification Search ............ 180/337, 180/312, 368; 464/132; 384/537, 91, 126, 384/127
See application file for complete search history.

(56) References Cited

U.S. PATENT DOCUMENTS

| 2,970,673 | A | * | 2/1961 | Isbell ................. 188/18 A |
| 2,998,287 | A | * | 8/1961 | Pritchett ............. 384/466 |
| 2011/0144848 | A1 | * | 6/2011 | Yoshizue et al. ....... 701/22 |
| 2011/0247890 | A1 | * | 10/2011 | Stoehr et al. ......... 180/312 |

* cited by examiner

*Primary Examiner* — Paul N Dickson
*Assistant Examiner* — Karen A Beck
(74) *Attorney, Agent, or Firm* — Fredrikson & Byron, P.A.

(57) ABSTRACT

The invention provides a trunnion bearing assembly for the drive system of a snow blower, mower, tractor, or other self-propelled utility vehicle. In certain embodiments, the trunnion assembly comprises a bearing having ball bearings, roller bearings, or another type of bearing set. This can provide free relative rotation of several components of the bearing assembly relative to a trunnion housing of the bearing assembly. This rotation is imparted when a friction disk of the assembly engages a spinning motor flywheel of the drive system.

37 Claims, 14 Drawing Sheets

BEARING ASSEMBLY

FIELD OF THE INVENTION

The invention relates generally to bearing assemblies. More particularly, the invention relates to a bearing assembly for the drive system of a snow blower, mower, tractor, or other self-propelled utility vehicle.

BACKGROUND OF THE INVENTION

Some self-propelled utility vehicles have a drive system in which a trunnion bearing assembly is provided. A conventional trunnion bearing assembly is shown in FIG. 14. Here, the assembly has a bearing encapsulated in a stamped trunnion housing TH and mounted to an inner shaft IS. The trunnion housing is mounted at one end region of the inner shaft and a stamped plate SP is secured (staked) to an opposite end of the shaft. A rubber wheel (not shown) is attached to the stamped plate SP. A hex axle (not shown) is mounted in a hex-shaped internal opening IO of the shaft IS. A shift linkage (not shown) is attached to the trunnion housing TH by virtue of two pins or the like received respectively in two openings OP defined by two trunnions TR of the housing. When the shift linkage is moved to a drive position, the rubber wheel moves into driven engagement with a motor flywheel (not shown), thereby causing conjoint rotation of the rubber wheel, the stamped plate SP, the inner shaft IS, and the axle. In response to this rotation of the axle, at least one driven wheel (not shown) of the vehicle rotates so as to propel the vehicle.

The conventional trunnion bearing assembly of FIG. 14 has drawbacks. They stem from having the inner shaft IS itself define the inner race of the bearing. There is, for example, significant waste (in terms of scrap material) in the machining required to give the exterior of the shaft the contour that defines the inner race. This machining also consumes a considerable amount of tooling. Further, if this machining is not done accurately, then the bearing may not function properly. Moreover, it would be desirable to avoid the secondary operation of having to go back and broach the hex-shaped internal opening IO of the shaft IS. Still further, because the stamped plate SP is staked to one end of the shaft IS, the shaft cannot be hardened sufficiently without great expense. As a result, the inner race wears faster than other bearing components. This shortens the life of the bearing.

It would be desirable to provide a bearing assembly that eliminates the problems associated with conventional trunnion bearing assemblies of the nature described.

SUMMARY OF THE INVENTION

Some embodiments of the invention provide a bearing assembly comprising a tube shaft having a central axis and extending between a trunnion housing and a friction disk base plate. In the present embodiments, the trunnion housing has two opposed trunnions each defining an elongated mount opening centered on an axis at least generally perpendicular to the central axis of the tube shaft. A bearing comprising an inner race, an outer race, and a bearing set is assembled onto an exterior surface of the tube shaft such that the inner race is carried against the exterior surface of the tube shaft. The trunnion housing is disposed about the bearing so as to provide free rotation of the tube shaft relative to the trunnion housing. Preferably, the friction disk base plate is mounted on the tube shaft and is retained at a position spaced apart from the trunnion housing by an alignment spacer provided between the friction disk base plate and the bearing.

In certain embodiments, the invention provides a self-propelled snow blower, mower, or tractor having a drive assembly comprising a motor flywheel, a shift linkage, an axle, a trunnion bearing assembly, and at least one driven wheel to create a driving force for the snow blower, mower, or tractor. The trunnion bearing assembly comprises a tube shaft having a central axis and defining an internal passage in which the axle is received such that the axle and tube shaft are configured to rotate together. The tube shaft extends between a trunnion housing and a friction disk base member on which a friction disk is provided. In the present embodiments, the trunnion housing has two opposed trunnions each defining an elongated mount opening centered on an axis at least generally perpendicular to the central axis of the tube shaft. A bearing comprising an inner race, an outer race, and a bearing set is assembled on an exterior surface of the tube shaft such that the inner race is carried against the exterior surface of the tube shaft. The trunnion housing is disposed about the bearing so as to provide free rotation of the tube shaft relative to the trunnion housing. The friction disk base member is mounted on the tube shaft and is retained at a position spaced apart from the trunnion housing by an alignment spacer provided between the friction disk base member and the bearing. In certain preferred embodiments, the shift linkage comprises two shafts mounted respectively in the two elongated mount openings of the trunnions. The shift linkage is moveable between a neutral position and a drive position. The friction disk moves into driven engagement with the motor flywheel in response to the shift linkage moving from its neutral position to its drive position. When the friction disk is in driven engagement with the motor flywheel the friction disk, the friction disk base member, the tube shaft, and the axle rotate together in response to which the driven wheel rotates so as to propel the snow blower, mower, or tractor.

DETAILED DESCRIPTION OF PREFERRED EMBODIMENTS

The following detailed description is to be read with reference to the drawings, in which like elements in different drawings have like reference numbers. The drawings, which are not necessarily to scale, depict selected embodiments and are not intended to limit the scope of the invention. Skilled artisans will recognize that the given examples have many alternatives that fall within the scope of the invention.

The invention provides a bearing assembly for the drive system of a snow blower, mower, tractor, or other self-propelled vehicle. The bearing assembly is configured for use in a drive system having a motor flywheel. The bearing assembly facilitates power transmission from the flywheel to at least one driven wheel of the vehicle. There may, of course, be two or more such driven wheels. The vehicle is thus self-propelled.

Figure 1:
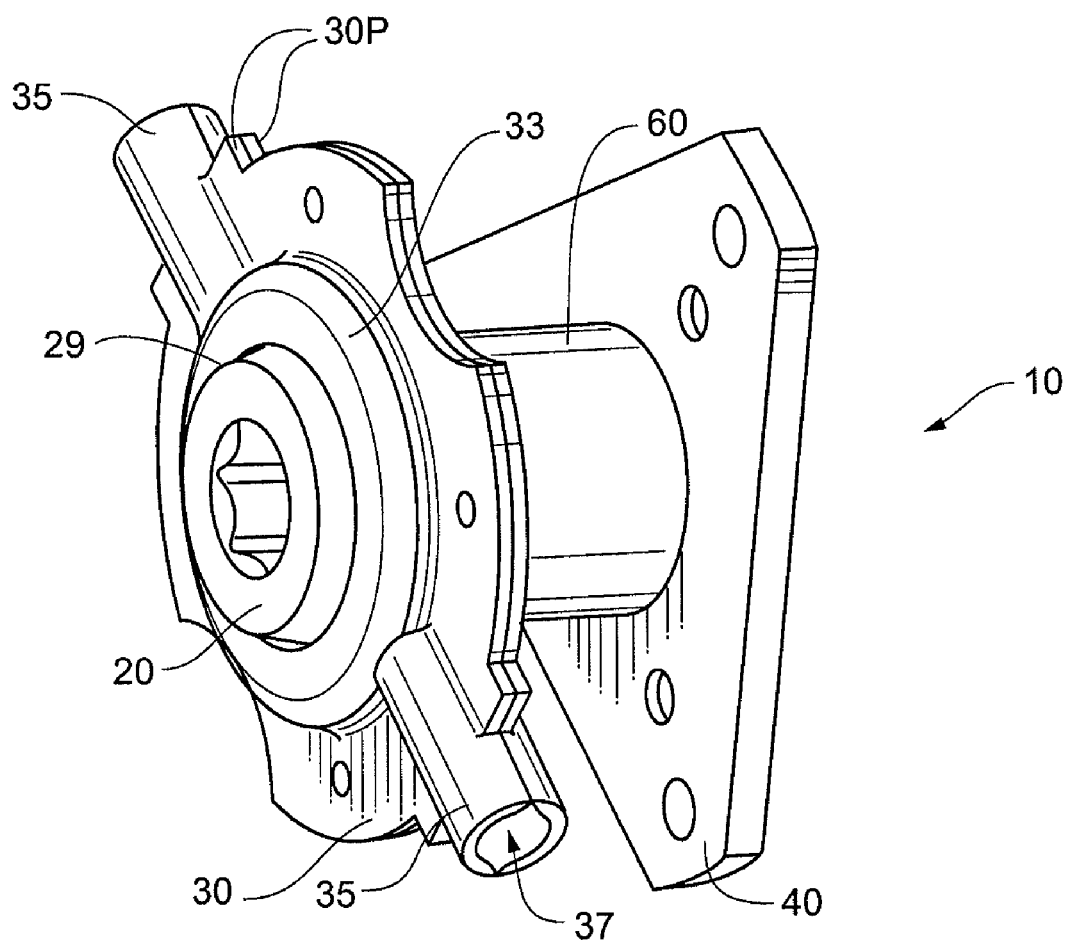
FIG. 1 is a perspective view of a bearing assembly in accordance with certain embodiments of the present invention.
Figure 2:
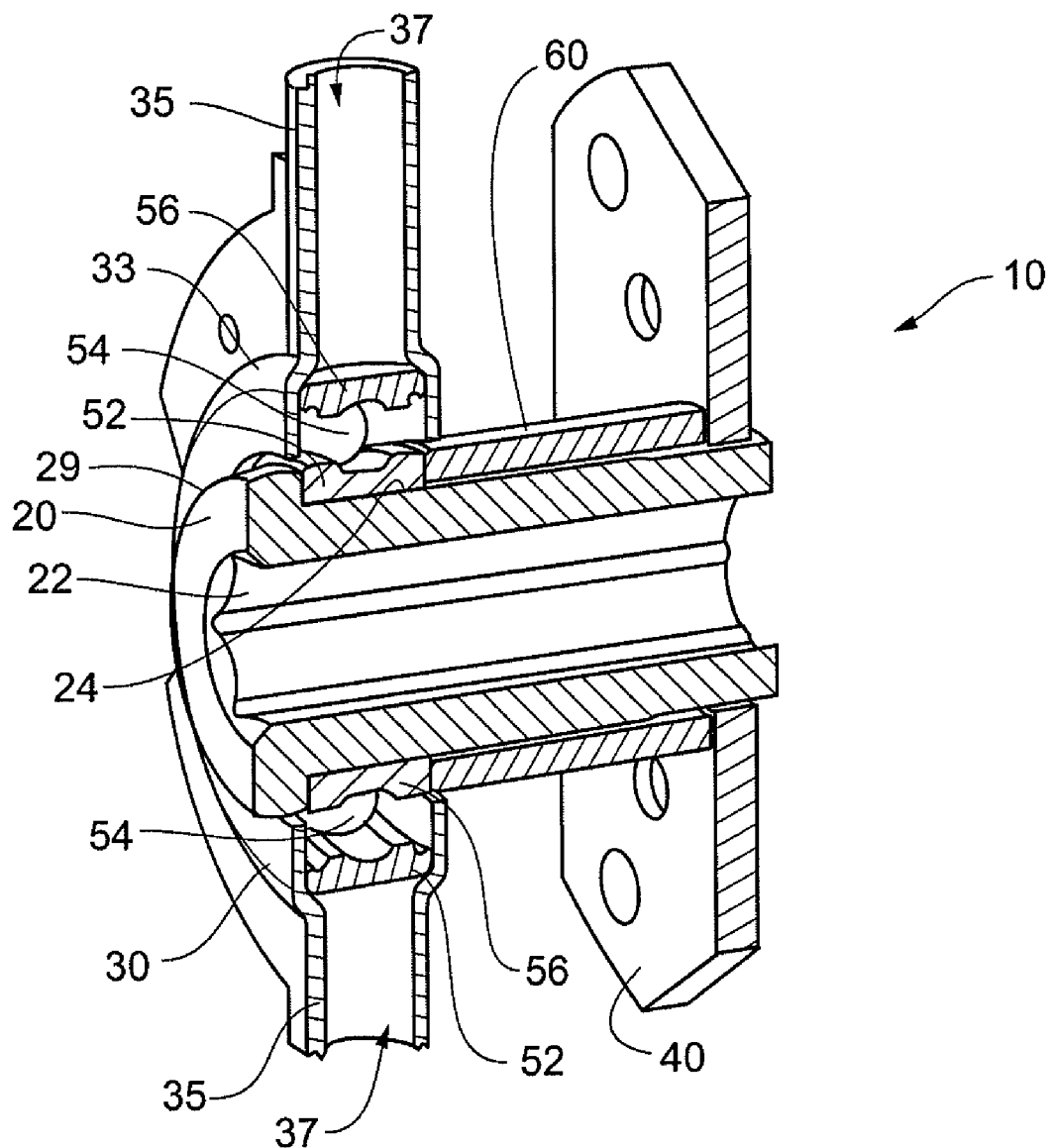
FIG. 2 is a cross-sectional view of the bearing assembly of FIG. 1.
Figure 3:
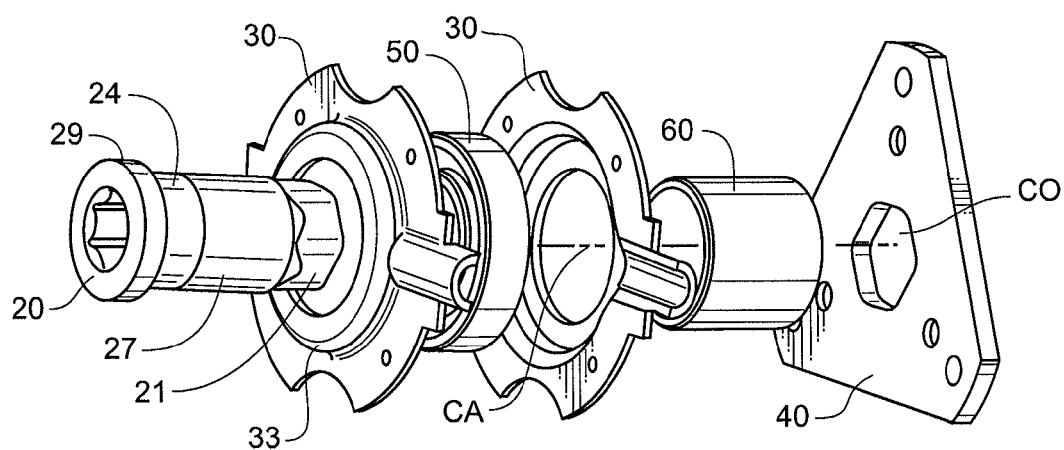
FIG. 3 is a fully exploded view of the bearing assembly of FIG. 1.
Figure 4:
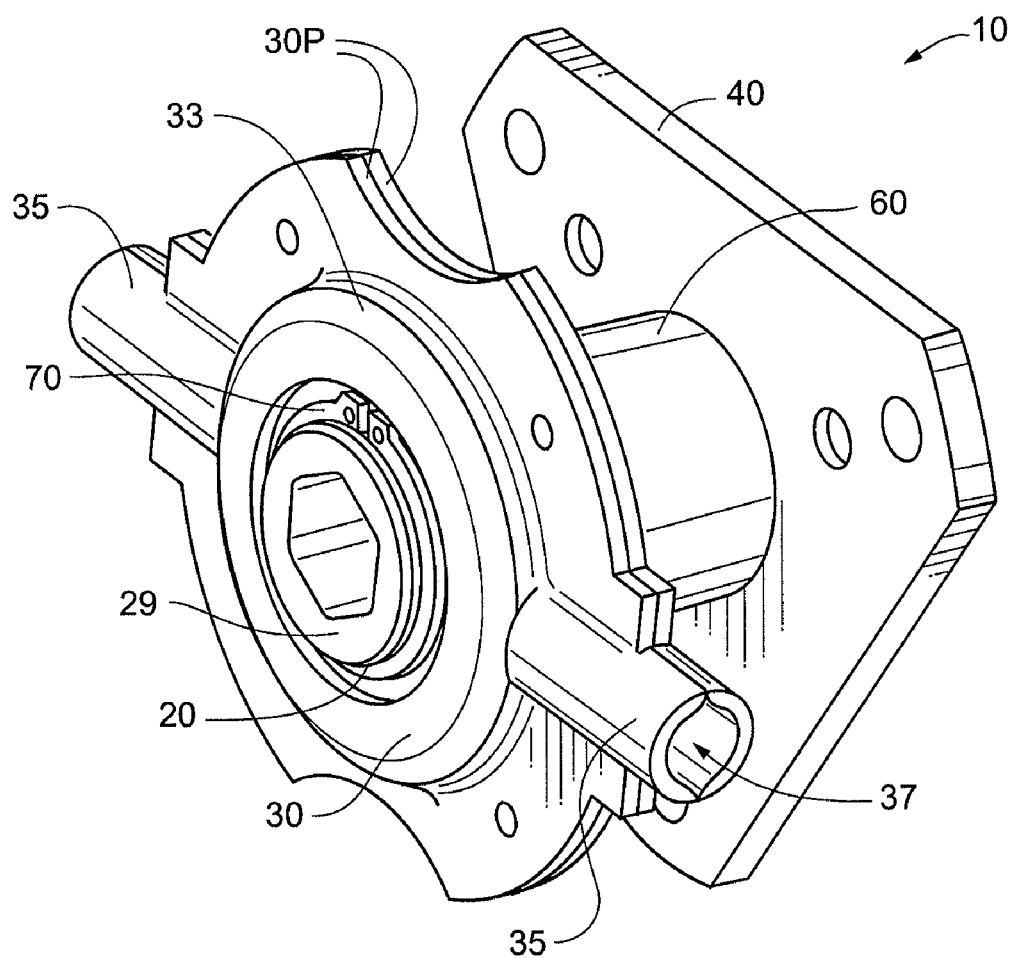
FIG. 4 is a perspective view of a bearing assembly in accordance with certain other embodiments of the present invention.

Thus, certain embodiments of the invention provide a bearing assembly for the drive unit of a snow blower, mower, tractor, or other self-propelled utility vehicle. Generally, the bearing assembly 10 includes a tube shaft 20, a housing 30, a bearing 50, and a friction disk base member (e.g., a friction disk base plate) 40. FIGS. 1-3 depict one exemplary embodiment; FIGS. 4-9 depict another exemplary embodiment.

The bearing assembly 10 comprises a tube shaft 20 having a central axis CA and extending between the housing 30 and the friction disk base member 40. In the embodiments illustrated, the tube shaft 20 extends entirely between the housing 30 and the friction disk base member 40, and actually projects slightly beyond opposed sides of the housing and the friction disk base member. The illustrated tube shaft 20 is a single (i.e., one-piece) generally cylindrical body. However, the tube shaft can alternatively comprise two generally cylindrical bodies, which may be joined together in an end-to-end fashion when fully assembled.

The tube shaft 20 has opposed first and second end regions. This is perhaps best seen in FIGS. 3 and 6. In the illustrated embodiments, the housing 30 is located at (e.g., mounted at) the first end region of the tube shaft 20, and the friction disk base member 40 is located at (e.g., mounted on) the second end region of the tube shaft. The illustrated housing 30 is mounted for rotation relative to the tube shaft 20, whereas the friction disk base member 40 is rigidly joined (e.g., staked) to the tube shaft. Thus, the tube shaft 20 and friction disk base member 40 are configured to rotate together freely relative to the housing 30 during operation.

The illustrated tube shaft 20 has a neck region 21 (which may be a reduced-diameter neck) at its second end. In these embodiments, the neck region 21 is configured to be mounted within an opening CO defined by the friction disk base member 40. Since the opening CO in these embodiments has a polygonal interior configuration, the neck region 21 has a corresponding polygonal exterior configuration. However, this is not required.

Figure 5:
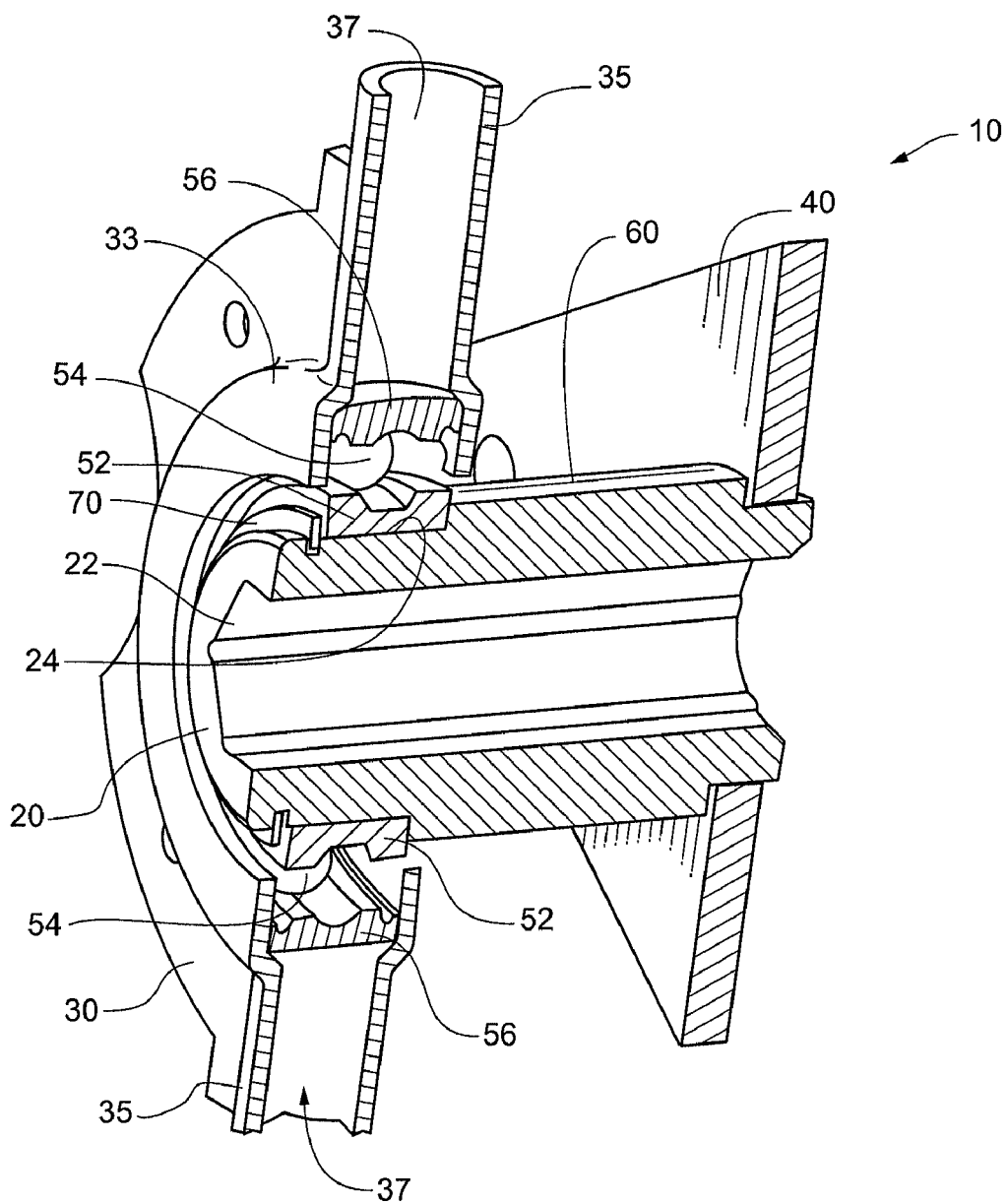
FIG. 5 is a cross-sectional view of the bearing assembly of FIG. 4.
Figure 6:
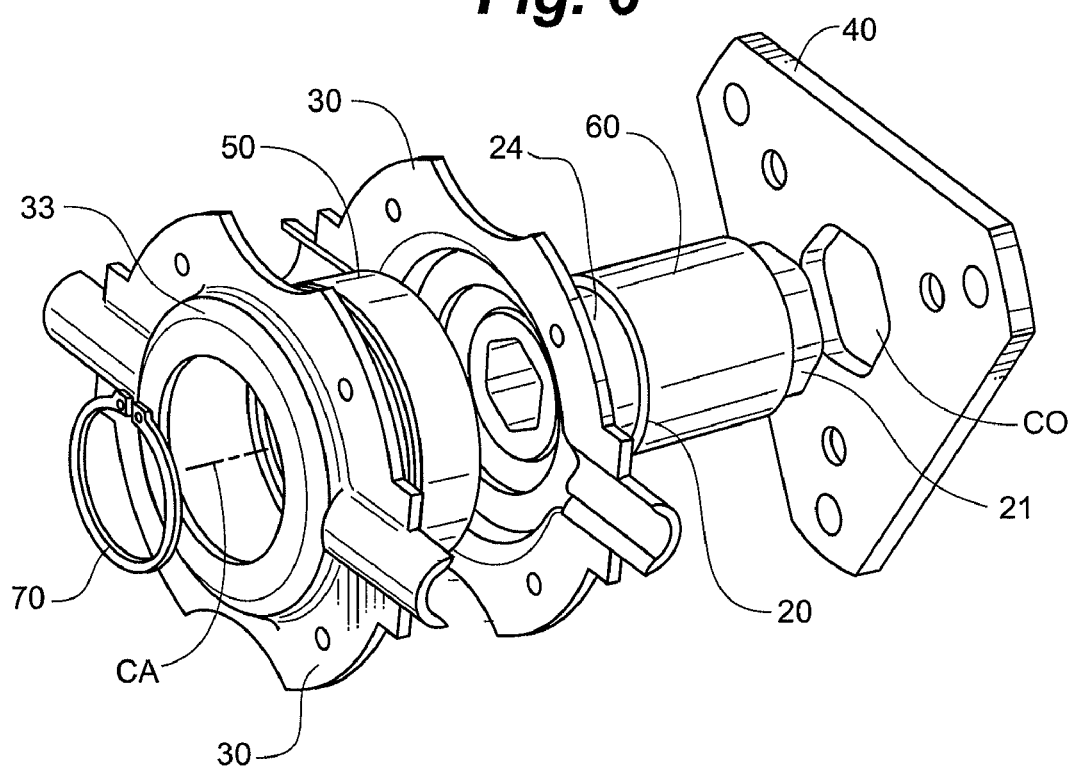
FIG. 6 is a fully exploded view of the bearing assembly of FIG. 4.

A central length of the illustrated tube shaft 20 has a circular exterior configuration with a diameter larger than the outer radial dimension of the neck 21. This, however, need not be the case in all embodiments. This is best seen in FIGS. 3 and 6. In these embodiments, the central length of the tube shaft has an outer diameter that is different from both an outer radial dimension of the neck region 21 and an outer radial dimension of the tube shaft at its first end. In FIGS. 1-3, the tube shaft 20 has an enlarged head 29 at its first end, and this head has a larger diameter than the central length of the tube shaft. In FIGS. 4-9, the tube shaft 20 has a reduced-diameter neck at its first end region, and this neck has a smaller outer diameter than the central length of the tube shaft. Many other variants of this nature are possible. Moreover, the tube shaft could alternatively have substantially the same outer diameter all along its length in other embodiments.

The housing 30 shown in FIGS. 1-3 and 4-9 is a trunnion housing having two opposed trunnions 35. In other embodiments, the trunnion housing may have only a single trunnion, or it may have two trunnions not located on a common axis. In preferred embodiments, each trunnion 35 defines an elongated mount opening 37 centered on an axis that is at least generally (e.g., substantially) perpendicular to the central axis CA of the tube shaft 20. Preferably, when the tube shaft 20 rotates relative to the housing 30, the axis of each trunnion remains (at all times and positions during the rotation) at least generally perpendicular to the tube shaft's central axis CA.

Each of the illustrated trunnion mount openings 37 is configured (e.g., sized and shaped) to receive a mating shaft, pin, or other detent of a shift linkage of the drive system. In the illustrated embodiments, the trunnion mount openings 37 are generally circular in cross section. However, this is not required. For example, these openings can alternatively be generally square, generally oval, or any other shape that accommodates attachment to the particular shift linkage used in the drive system.

Thus, the trunnions 35 shown in the figures define openings 37 to receive male detents of the shift linkage. However, the trunnions can alternatively define male detents that engage corresponding female detents of the shift linkage. Many variants of this nature will be apparent to skilled artisans given the present disclosure as a guide.

The illustrated housing 30 has a generally annular configuration. Here, the housing defines both a recess in which the bearing 50 is mounted and the two trunnions 35. The recess for receiving the bearing 50 is a generally annular channel, which is open radially inwardly. The open side of the channel faces toward the tube shaft 20. In the illustrated embodiments, this bearing channel has a generally rectangular or square cross section (taken in a plane lying on the central axis CA of the tube shaft). This, however, is not required. For example, if the bearing itself does not have a rectangular or square cross section, then it may be desirable for the housing to define a differently shaped channel.

The bearing 50 preferably comprises an inner race 52, an outer race 56, and a bearing set 54. The illustrated bearing 50 (including the inner race, outer race, and bearing set) is assembled onto (e.g., mounted on) an exterior surface 24 of the tube shaft 20 such that the inner race 52 is carried against the exterior surface of the tube shaft. Here, the bearing 50 has a ring-like configuration and is disposed about the tube shaft 20, such that the tube shaft is nested concentrically within the bearing. Reference is made to FIGS. 2 and 5. The illustrated inner race 52 comprises an annular wall having an inward face, which is carried against the exterior surface 24 of the tube shaft 20, and an outward face against which the ball bearings (or other bearings) ride during rotation.

As is perhaps best appreciated in FIGS. 2 and 3, the tube shaft 20 can advantageously have a bearing seat. When provided, the bearing seat can optionally comprise an outer surface region (optionally having a slightly greater outer diameter than an adjacent region of the tube shaft's exterior surface) configured to provide a light press fit of the bearing 50 thereon, e.g., such that the bearing when forced onto the bearing seat of the tube shaft is retained thereon by a press-fit relative dimensioning (and the resulting press-fit friction force) of the bearing and the tube shaft's bearing seat. This feature, however, is not required.

The trunnions 35 of the illustrated housing 30 are cylindrical forms projecting radially outward. As noted above, however, the trunnions need not be cylindrical in all embodiments. Instead, they can have square, rectangular, or other polygonal configurations. Other forms are possible as well.

In the illustrated embodiments, the trunnions 35 extend radially outward from an inner housing portion (e.g., a ring-like inner wall section) 33 that defines the recess in which the bearing is received. Here, the trunnion mount openings 37 are open to (i.e., open into) the bearing recess, although this is not required.

The illustrated housing 30 is disposed about the bearing 50 so as to provide free rotation of the tube shaft 20 relative to the housing. As shown in FIGS. 2 and 5, the housing 30 preferably encapsulates (or "embraces" or "houses") at least part of the bearing 50. In the illustrated embodiments, the housing embraces the outer race, but not the inner race 52.

In preferred embodiments, the bearing 50 is retained between the outer surface 24 of the tube shaft 20, the trunnion housing 30, the alignment spacer 60, and either an enlarged head 29 of the tube shaft or a retention ring 70 on an end region of the tube shaft. In the embodiment of FIGS. 1-3, the bearing 50 is retained between components 20, 30, 60, 29. As illustrated, the bearing is retained directly between these components. That is, there is no other part or component between the bearing 50 and the adjacent components 20, 30, 60, 29. However, this certainly is not required. For example, it may be desirable to add one or more intermediate components or parts, depending upon the particulars of the desired assembly and/or taking into consideration the desired manufacturing and assembly method. In the embodiment of FIGS. 4-9, a retention ring (e.g., a snap ring) 70 is provided in a slot on the head 29 of the tube shaft, such that the bearing 50 is retained between components 20, 30, 60, 70. Here again, the illustrated bearing 50 is retained directly between these components, although intermediate components or parts may be present in other embodiments.

The illustrated trunnion housing 30 comprises two plates 30P assembled together with the bearing 50 in between. In alternate embodiments, the trunnion housing can comprise more than two plates, or the housing can be one integral piece. Each plate 30P of the illustrated housing 30 defines half of each trunnion 35. As noted above, each of the two trunnions 35 can optionally have a generally cylindrical configuration projecting radially outward. However, this is not required, as already explained.

The friction disk base member 40 is retained in a position spaced apart from the trunnion housing 30 by the alignment spacer 60. The illustrated alignment spacer 60 extends entirely between the friction disk base member 40 and the bearing 50. However, this is not strictly required. For example, the alignment spacer can alternatively be provided in the form of two shoulders, one contiguous to the friction disk base member, the other contiguous to the bearing, with space between those shoulders such that the alignment spacer does not extend entirely between the bearing and the friction disk base member. Thus, the alignment spacer 60 can be provided in different forms.

In the embodiments of FIGS. 4-9, the alignment spacer 60 is a positioner shoulder (e.g., projecting radially outward) defined by the tube shaft 20. Here, the tube shaft 20 has opposed first and second end regions, the bearing 50 is mounted on the first end region, the trunnion housing 30 is mounted on the bearing 50, and the friction disk base member 40 is mounted on the second end region of the tube shaft. This particular shoulder extends entirely between the bearing 50 and the friction disk base member 40. As noted above, however, this is not required.

In the embodiments of FIGS. 1-3, the alignment spacer 60 is a discrete positioner ring mounted around an exterior sidewall 27 of the tube shaft 20. Here, the tube shaft 20 is nested concentrically within the positioner ring.

It is preferred that the alignment spacer 60 not be in direct contact with the trunnion housing 30. Since the alignment spacer 60 preferably is free to rotate (e.g., together with the tube shaft 20, the inner race 52 of the bearing, and the friction disk base member 40) relative to the trunnion housing 30, it will generally be preferred that the alignment spacer not rub against the trunnion housing during rotation. Thus, the alignment spacer 60 preferably is spaced apart from the trunnion housing 30 (e.g., at all times during rotation). In the illustrated embodiments, the alignment spacer 60 contacts the bearing 50 (e.g., the inner race 52) but not the housing 30.

In the illustrated embodiments, the alignment spacer 60 has opposed first and second ends, the first end is carried directly against the bearing 50, and the second end is carried directly against the friction disk base member. Here, the first end of the alignment spacer is a generally (or substantially) planar surface that buts-up against a generally (or substantially) planar side of the bearing. However, this is not required. In the illustrated embodiments, a plane that is perpendicular to the tube shaft's central axis and that passes through the first end of the alignment spacer also passes through the trunnion housing. This detail, however, is by no means required in all embodiments.

Referring to FIGS. 2 and 5, the illustrated alignment spacer has an exterior surface with a maximum height section located at least substantially entirely between adjacent facing sides of the housing 30 and the friction disk base member 40. "Height" here is defined as the radial distance from the central axis CA of the tube shaft 20.

Preferably, the alignment spacer does not define the inner race of the bearing. This can be seen, for example, in the embodiments of FIGS. 1-3 and 4-9, wherein the alignment spacer and the inner race of the bearing are separate bodies (which are carried alongside each other).

Figure 14:
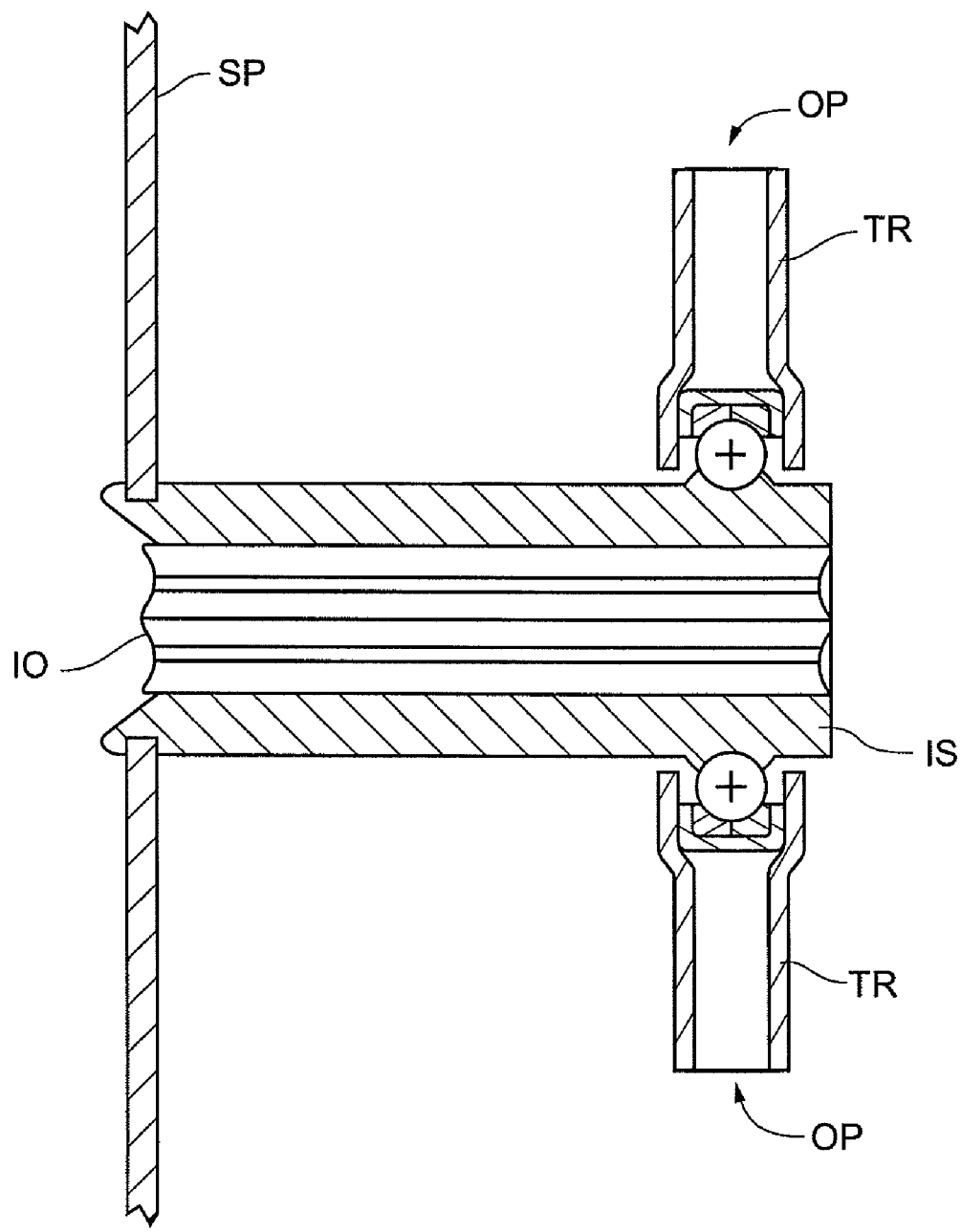
FIG. 14 is a cross-sectional view of a prior art trunnion bearing assembly.

The illustrated friction disk base member 40 comprises (e.g., is) a plate (a "friction disk base plate") that defines a central opening CO in which an end region of the tube shaft 20 is mounted. Preferably, the tube shaft 20 is staked to the friction disk plate 40, as is perhaps best appreciated with reference to FIG. 2. The staking here can be like that shown in greater detail in the prior art illustration of FIG. 14. For embodiments of this nature, the tube shaft will normally be formed of a non-hardened material, e.g., a low carbon steel of machining grade.

In the illustrated embodiments, the friction disk base member (e.g., plate) 40 is mounted on the tube shaft 20. In an alternate embodiment, the friction disk base member is attached to the alignment spacer, and the spacer is attached to the tube shaft. Other variants of this nature may also be used.

If desired, the friction disk base member 40 can be a housing, a block, or some other body. In the embodiments illustrated, though, the friction disk base member is a plate having a generally flat monolithic form. In other embodiments, two plates can be joined together in a side-by-side configuration to form the friction disk base plate. This may be advantageous for applications where it is beneficial that the friction disk base plate be as rigid as possible.

The illustrated friction disk base plate 40 lies in a plane at least generally (e.g., substantially) perpendicular to the central axis CA of the tube shaft 20. Here, the friction disk base plate 40 has a generally triangular configuration. However, this is by no means required. For instance, the friction disk base plate can alternatively have a square configuration, a circular configuration, etc. Since this plate serves as a mechanical support on which a friction disk (defined as the body or bodies that contact the motor flywheel, whether or not such body or bodies is/are actually a disk or disk-shaped) is mounted, it typically has a plurality of fastener holes (as shown in the figures) to facilitate mounting the friction disk on the plate.

Figure 13:
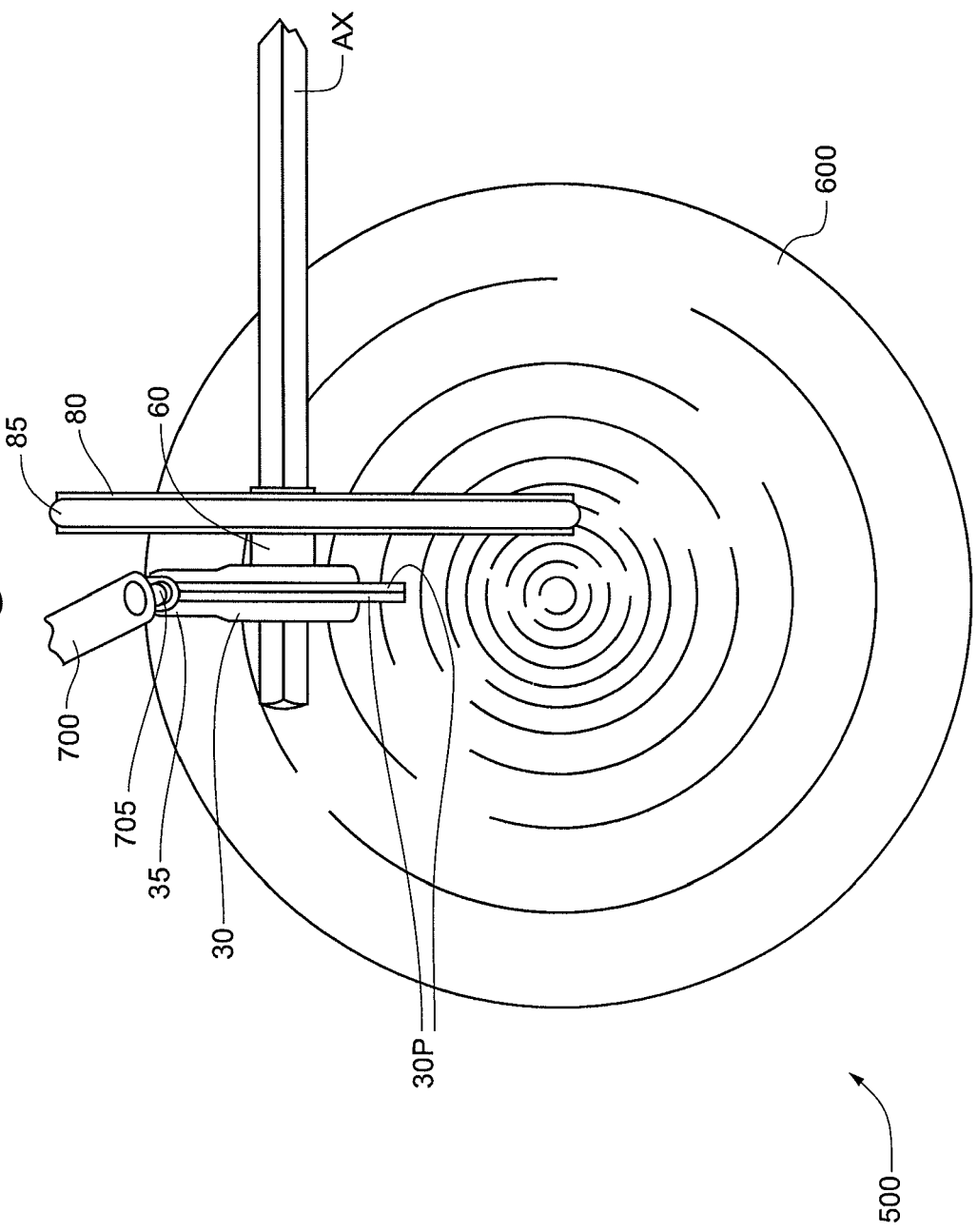
FIG. 13 is a perspective view of a drive assembly in accordance with certain embodiments of the invention.

Certain embodiments provide a friction disk 80 on the friction disk base member 40. Reference is made to FIG. 13. Here, the friction disk 80 has a tread surface 85 to engage a motor flywheel 600. During operation of the vehicle, the flywheel 600 rotates. When the tread surface 85 contacts the rotating flywheel 600, the resulting friction causes the friction disk (together with the friction disk base member) to rotate. Thus, the friction disk 80 preferably comprises a wheel, disk, belt, or other surface(s) of rubber or another high friction material that defines the tread surface 85.

As can be seen in FIGS. 1-7 and 9, the tube shaft 20 preferably defines an internal passage configured to receive a mating axle such that the tube shaft and axle rotate together (e.g., are locked together so as to rotate conjointly). The manner in which the axle AX mates with the tube shaft 20 is perhaps best appreciated by referring to FIG. 13, which depicts the bearing assembly 10 operatively assembled as part of the drive system of a vehicle. Preferably, the configuration of the tube shaft's internal passage matches the external configuration of the axle such that when the axle is received in the tube shaft's internal passage, the axle and tube shaft are prevented from rotating relative to each other. Thus, the axle AX rotates when the tube shaft 20 rotates. In many cases, the internal passage of the tube shaft 20 will have a polygonal (hexagonal, square, pentagonal, etc.) configuration. If desired, the internal passage could have a "D-shaped" configuration or many other configurations having at least one flat.

Insofar as the bearing set is concerned, it will commonly comprise a series of ball bearings 54 disposed between the inner 52 and outer 56 races. In other cases, a plurality of roller bearings may be used. In still other cases, a low friction ring can serve as the bearing set.

The illustrated friction disk base plate and housing plates can be made by progressive stamping if high volume production is desired. Or, if low volume stamping is sufficient, then hand feeding may be used. The friction disk base plate and housing plates are preferably formed of low carbon steel, although materials such as medium carbon steel, stainless steel, HSLA, etc. may also be used. The tube shaft can be cold headed if high production volume is desired. When low production volume is sufficient, the tube shaft can be machined. When a discrete spacer (alignment spacer) is provided, it can be cold headed when produced in high volume, or machined when produced in low volume. Preferably, precision ground bearings are used for the bearing set.

The trunnion bearing assembly 10 of FIGS. 1-3 can be assembled as follows. The two halves of the housing 30 are assembled over the bearing 50 and fastened together. As is perhaps best seen in FIG. 1, the two housing plates 30P can have fastener openings used to secure the two plates together. The bearing/housing subassembly is positioned on the tube shaft 20 such that the bearing is carried against the enlarged head 29 of the tube shaft. A discrete positioner ring 60 can then be mounted on the free end of the tube shaft, such that the positioner ring is carried against the bearing 50. The friction disk base plate 40 can then be staked to the free end of the tube shaft 20.

Figure 7:
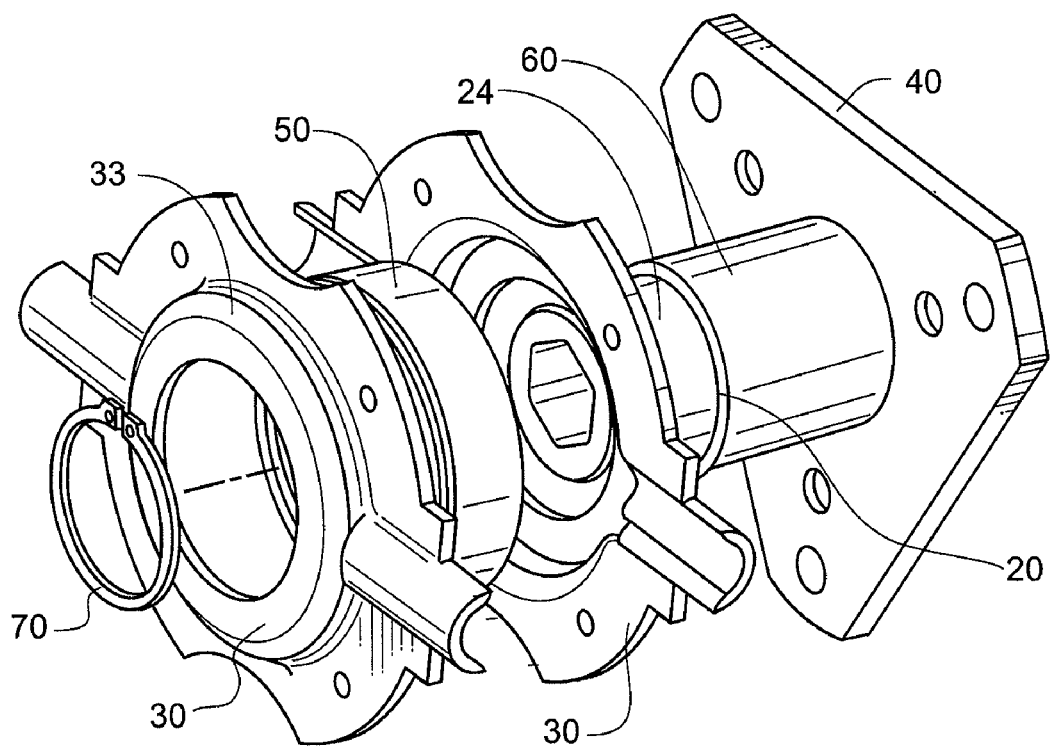
FIG. 7 is a partially exploded view of the bearing assembly of FIG. 4.
Figure 8:
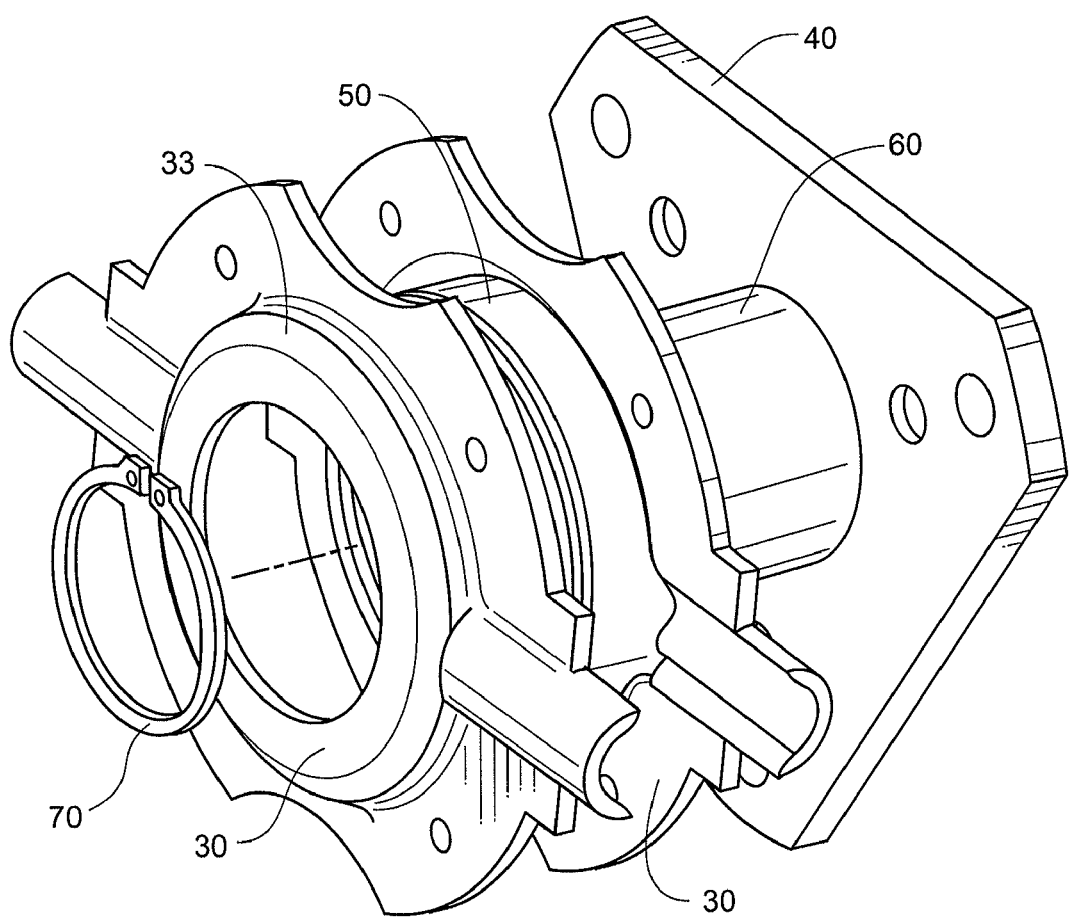
FIG. 8 is another partially exploded view of the bearing assembly of FIG. 4.
Figure 9:
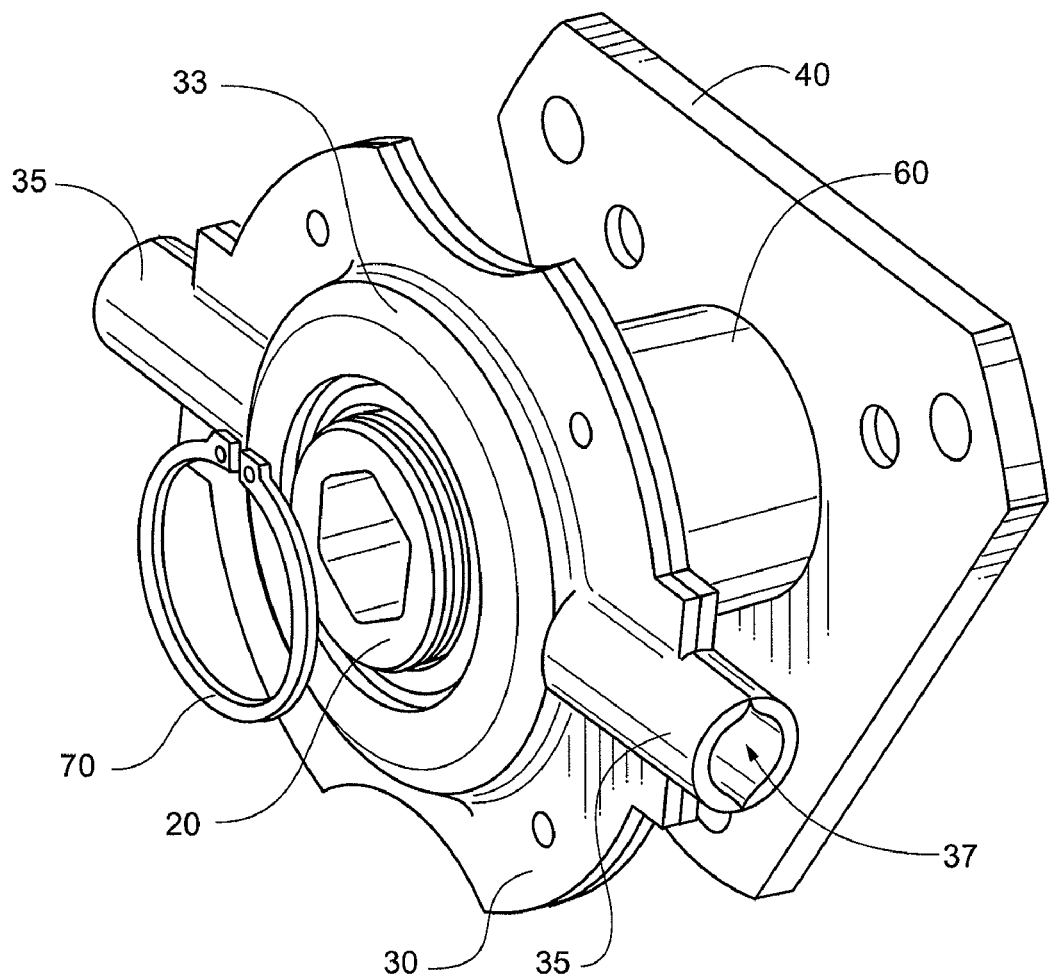
FIG. 9 is yet another partially exploded view of the bearing assembly of FIG. 4.

With respect to the embodiment of FIGS. 4-9, the assembly method proceeds in a slightly different manner. The friction disk base plate 40 is staked to the second end of the tube shaft 20. Reference is made to FIG. 7. The two housing plates 30P are assembled together over the bearing 50 and fastened together (as described above). The bearing/housing subassembly is positioned over the first end region of the tube shaft 20 such that the bearing 50 is carried against the alignment spacer 60, which in this embodiment is a shoulder integral to the tube shaft. Reference is made to FIG. 9. Finally, the retention ring 70 is snapped into the slot on the first end region of the tube shaft 20, as is best seen in FIG. 5.

In certain embodiments, the invention provides a drive assembly (or "drive system") for a snow blower, mower, tractor, or other self-propelled vehicle. Reference is made to FIG. 13. Here, the drive assembly comprises a motor flywheel 600, a shift linkage 700, an axle AX, and a trunnion bearing assembly 10. The trunnion bearing assembly 10 has already been described.

Briefly, though, in the present drive assembly embodiments, the bearing assembly 10 comprises a tube shaft 20 with a central axis CA (shown in FIGS. 3 and 6) defining an internal passage in which the axle AX is received such that the axle and tube shaft are constrained to rotate together. The illustrated tube shaft 20 extends between the trunnion housing 30 and the friction disk base member 40, on which a friction disk 80 is provided. The illustrated housing 30 has two opposed trunnions 35 (one of these is out of sight in FIG. 13 due to the viewing angle) each defining an elongated mount opening centered on an axis at least generally perpendicular to the central axis of the tube shaft. A bearing 50 comprising an inner race 52, an outer race 56, and a bearing set 54 is assembled on an exterior surface 24 of the tube shaft 20 such that the inner race is carried against the exterior surface of the tube shaft. The trunnion housing 30 is disposed about the bearing 50 so as to provide free rotation of the tube shaft 20 relative to the trunnion housing. The friction disk base member 40 is mounted on the tube shaft 20 and is retained in a position spaced apart from the trunnion housing 30 by the alignment spacer 60, which is located between the friction disk base member and the bearing 50.

In the present embodiments, the shift linkage 700 comprises two shafts 705 mounted respectively in the two elongated mount openings 37 of the trunnions 35 (one of these shafts 705 is out of sight in FIG. 13). The shift linkage 700 is moveable between a neutral position and a drive position. The friction disk 80 moves into driven engagement with the motor flywheel 600 in response to the shift linkage 700 moving from its neutral position to its drive position. And when the friction disk 80 is in driven engagement with the motor flywheel 600, the friction disk, the friction disk base member 40, the tube shaft 20, and the axle AX rotate together, in response to which a driven wheel DR (see FIGS. 10-12) rotates, e.g., so as to propel the vehicle.

In FIG. 13, the shift linkage 700 comprises two shafts that are received respectively in two openings defined by the two trunnions 35. If desired, the trunnions can alternatively define male shafts and the shift linkage can define corresponding female openings. Many variants of this nature are anticipated and will be apparent to skilled artisans given the present teaching as a guide.

Figure 10:
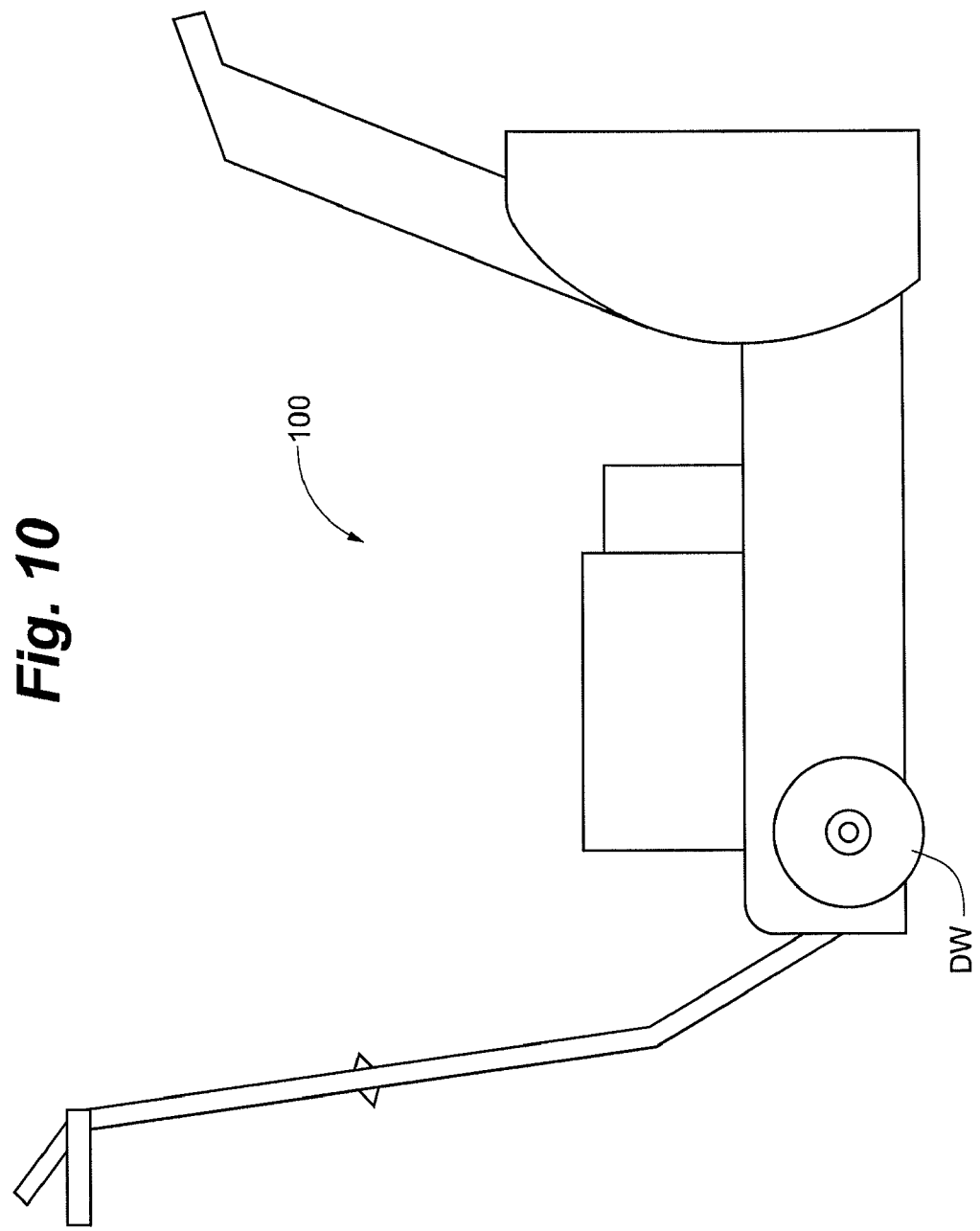
FIG. 10 is a schematic illustration of a snow blower equipped with a bearing assembly of the present invention.
Figure 11:
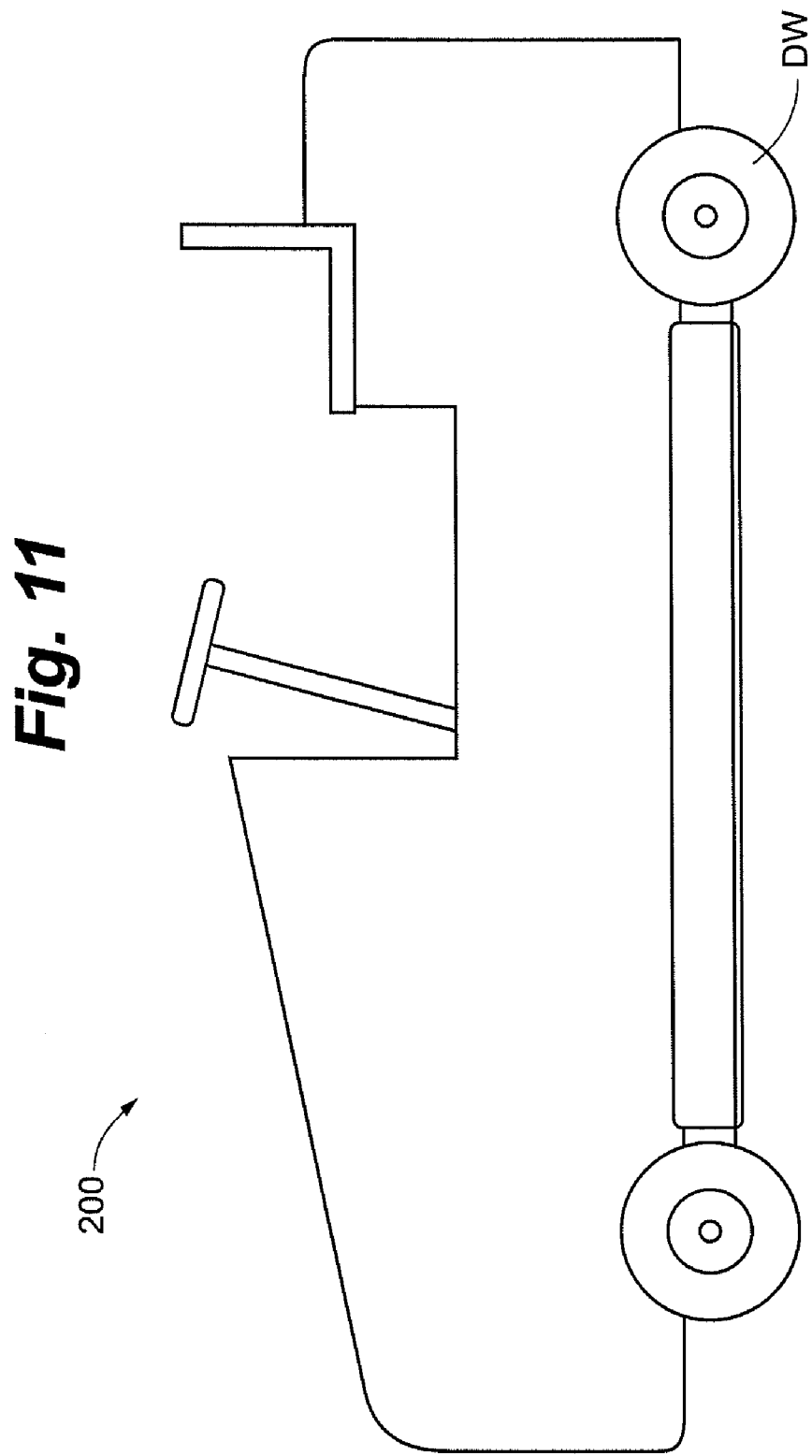
FIG. 11 is a schematic side view of a tractor equipped with a bearing assembly of the present invention.
Figure 12:
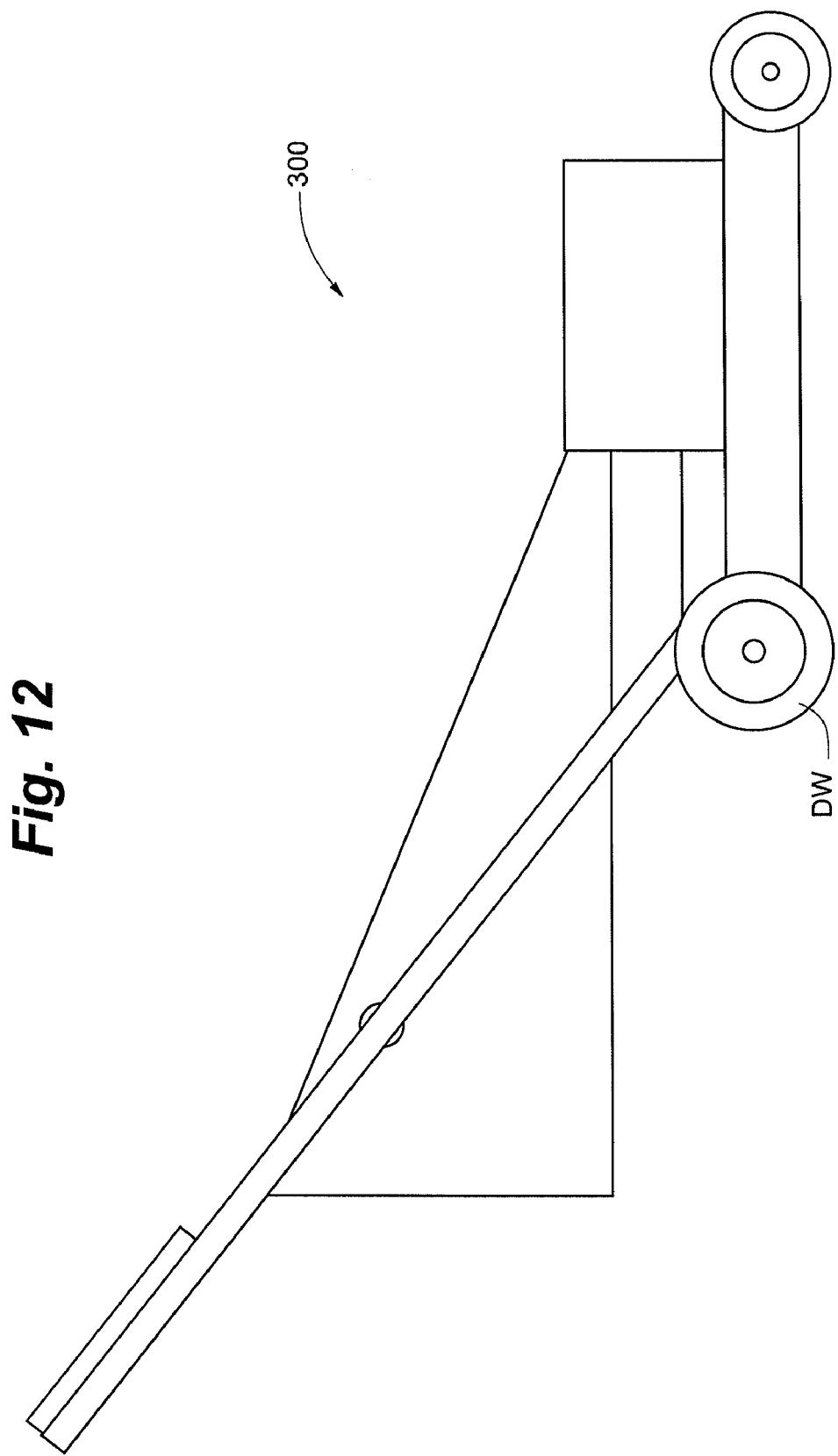
FIG. 12 is a schematic side view of a mower equipped with a bearing assembly of the present invention.

Thus, some embodiments of the invention provide a trunnion bearing assembly 10, while other embodiments provide a drive assembly for a snow blower, mower, tractor, or other self-propelled vehicle. Still other embodiments provide the vehicle itself. Reference is made to FIGS. 10-12. FIG. 10 depicts a snow blower 100 having at least one driven wheel DW to create a driving force for snow blower. Here, the snow blower 100 is equipped with a drive assembly of the nature described above (i.e., a drive assembly comprising the present trunnion bearing assembly). Similarly, FIG. 11 depicts a tractor 200 having at least one driven wheel DW to create a driving force for the tractor. Here again, the tractor 200 is equipped with a drive assembly of the nature described above. FIG. 12 depicts a mower 300 having at least one driven wheel DW to create a driving force for the mower. Again, the mower 300 is equipped with a drive assembly of the type described. Other self-propelled utility vehicles can likewise be provided with a drive system comprising the present trunnion bearing assembly.

While certain preferred embodiments of the invention have been described, it should be understood that various changes, adaptations and modifications can be made without departing from the spirit of the invention and the scope of the appended claims.

What is claimed is:

1. A bearing assembly comprising a tube shaft having a central axis and extending between a trunnion housing and a friction disk base plate, the trunnion housing having two opposed trunnions each defining an elongated mount opening centered on an axis at least generally perpendicular to the central axis of the tube shaft, wherein a bearing comprising an inner race, an outer race, and a bearing set is assembled onto an exterior surface of the tube shaft such that the inner race is carried against the exterior surface of the tube shaft, and the trunnion housing is disposed about the bearing so as to provide free rotation of the tube shaft relative to the trunnion housing, the friction disk base plate being mounted on the tube shaft and being retained at a position spaced apart from the trunnion housing by an alignment spacer provided between the friction disk base plate and the bearing.

2. The bearing assembly of claim 1 wherein the alignment spacer contacts the bearing but is spaced apart from the trunnion housing.

3. The bearing assembly of claim 1 wherein the alignment spacer has opposed first and second ends, the first end carried directly against the bearing, the second end carried directly against the friction disk base plate.

4. The bearing assembly of claim 3 wherein the first end of the alignment spacer is a generally planar surface that buts-up against a generally planar side of the bearing.

5. The bearing assembly of claim 3 wherein the first end of the alignment spacer is carried directly against the inner race of the bearing.

6. The bearing assembly of claim 3 wherein a plane that is perpendicular to the tube shaft's central axis and that passes through the first end of the alignment spacer also passes through the trunnion housing.

7. The bearing assembly of claim 1 wherein the alignment spacer has an exterior surface with a maximum height section located at least substantially entirely between adjacent facing sides of the trunnion housing and the friction disk base plate, wherein height is defined as the radial distance from the central axis of the tube shaft.

8. The bearing assembly of claim 1 wherein the alignment spacer entirely spans the distance between the friction disk plate and the bearing.

9. The bearing assembly of claim 1 wherein the alignment spacer comprises a positioner shoulder defined by the tube shaft, the positioner shoulder projecting radially outward.

10. The bearing assembly of claim 9 wherein the tube shaft has opposed first and second end regions, the bearing being mounted on the first end region, and the trunnion housing being mounted on the bearing, the friction disk base plate being mounted on the second end region of the tube shaft.

11. The bearing assembly of claim 1 wherein the alignment spacer is a discrete positioner ring mounted around an exterior sidewall of the tube shaft.

12. The bearing assembly of claim 1 wherein the tube shaft has opposed first and second end regions, the trunnion housing being located at the first end region of the tube shaft, the friction disk base plate being located at the second end region of the tube shaft.

13. The bearing assembly of claim 1 wherein the friction disk base plate defines a central opening in which an end region of the tube shaft is mounted.

14. The bearing assembly of claim 13 wherein the tube shaft is staked to the friction disk base plate.

15. The bearing assembly of claim 13 wherein the friction disk base plate lies in a plane at least generally perpendicular to the central axis of the tube shaft.

16. The bearing assembly of claim 1 wherein a friction disk is provided on the friction disk base plate, the friction disk having a tread surface to engage a motor flywheel.

17. The bearing assembly of claim 1 wherein the friction disk base plate and the tube shaft are configured to rotate together freely relative to the trunnion housing.

18. The bearing assembly of claim 1 wherein the bearing is retained between the outer surface of the tube shaft, the trunnion housing, the alignment spacer, and either an enlarged head of the tube shaft or a retention ring on an end region of the tube shaft.

19. The bearing assembly of claim 1 wherein the tube shaft defines an internal passage configured to receive a mating axle such that the tube shaft and axle are secured together for conjoint rotation.

20. The bearing assembly of claim 19 wherein the internal passage of the tube shaft has a polygonal interior configuration.

21. The bearing assembly of claim 1 wherein the trunnion housing has a generally annular configuration.

22. The bearing assembly of claim 21 wherein the trunnion housing comprises two plates assembled together with the bearing in between, each plate of the trunnion housing defining half of each trunnion.

23. The bearing assembly of claim 1 wherein each of the two trunnions has a generally cylindrical configuration projecting radially outward.

24. The bearing assembly of claim 1 wherein the bearing set comprises a series of ball bearings disposed between the inner and outer races.

25. A self-propelled snow blower, mower, or tractor having a drive assembly comprising a motor flywheel, a shift linkage, an axle, a trunnion bearing assembly, and at least one driven wheel to create a driving force for the snow blower, mower, or tractor, the trunnion bearing assembly comprising a tube shaft having a central axis and defining an internal passage in which the axle is received such that the axle and tube shaft are configured to rotate together, the tube shaft extending between a trunnion housing and a friction disk base member on which a friction disk is provided, the trunnion housing having two opposed trunnions each defining an elongated mount opening centered on an axis at least generally perpendicular to the central axis of the tube shaft, wherein a bearing comprising an inner race, an outer race, and a bearing set is assembled on an exterior surface of the tube shaft such that the inner race is carried against the exterior surface of the tube shaft, the trunnion housing being disposed about the bearing so as to provide free rotation of the tube shaft relative to the trunnion housing, the friction disk base member being mounted on the tube shaft and being retained at a position spaced apart from the trunnion housing by an alignment spacer provided between the friction disk base member and the bearing, the shift linkage comprising two shafts mounted respectively in the two elongated mount openings of the trunnions, the shift linkage being moveable between a neutral position and a drive position, wherein the friction disk moves into driven engagement with the motor flywheel in response to the shift linkage moving from its neutral position to its drive position, and wherein when the friction disk is in driven engagement with the motor flywheel the friction disk, the friction disk base member, the tube shaft, and the axle rotate together in response to which the driven wheel rotates so as to propel the snow blower, mower, or tractor.

26. The snow blower, mower, or tractor of claim 25 wherein the alignment spacer contacts the bearing but is spaced apart from the trunnion housing.

27. The snow blower, mower, or tractor of claim 25 wherein the alignment spacer has opposed first and second ends, the first end carried directly against the bearing, the second end carried directly against the friction disk base plate.

28. The snow blower, mower, or tractor of claim 27 wherein the first end of the alignment spacer is a generally planar surface that buts-up against a generally planar side of the bearing.

29. The snow blower, mower, or tractor of claim 27 wherein the first end of the alignment spacer is carried directly against the inner race of the bearing.

30. The snow blower, mower, or tractor of claim 27 wherein a plane that is perpendicular to the tube shaft's central axis and that passes through the first end of the alignment spacer also passes through the trunnion housing.

31. The snow blower, mower, or tractor of claim 25 wherein the alignment spacer has an exterior surface with a maximum height section located at least substantially entirely between adjacent facing sides of the trunnion housing and the friction disk plate, wherein height is defined as the radial distance from the central axis of the tube shaft.

32. The snow blower, mower, or tractor of claim 25 wherein the alignment spacer comprises a positioner shoulder defined by the tube shaft, the positioner shoulder projecting radially outward.

33. The snow blower, mower, or tractor of claim 25 wherein the alignment spacer is a discrete positioner ring mounted around an exterior sidewall of the tube shaft.

34. The snow blower, mower, or tractor of claim 25 wherein the friction disk base member comprises a plate defining a central opening in which an end region of the tube shaft is mounted, said plate lying in a plane at least generally perpendicular to the central axis of the tube shaft.

35. The snow blower, mower, or tractor of claim 25 wherein the friction disk comprises a rubber surface that contacts the motor flywheel when in said driven engagement.

36. The snow blower, mower, or tractor of claim 25 wherein the bearing is retained between the outer surface of the tube shaft, the trunnion housing, the alignment spacer, and either an enlarged head of the tube shaft or a retention ring on an end region of the tube shaft.

37. The snow blower, mower, or tractor of claim 25 wherein the tube shaft's internal passage has a polygonal interior configuration, the axle having a matching polygonal exterior configuration.

* * * * *